US012780973B2

(12) United States Patent
Oda et al.

(10) Patent No.: US 12,780,973 B2
(45) Date of Patent: Nov. 3, 2026

(54) THERMOPLASTIC RESIN COMPOSITION

(71) Applicant: KAO CORPORATION, Tokyo (JP)

(72) Inventors: Yoshiro Oda, Izumisano (JP); Keito Sato, Wakayama (JP)

(73) Assignee: KAO CORPORATION, Tokyo (JP)

( * ) Notice: Subject to any disclaimer, the term of this patent is extended or adjusted under 35 U.S.C. 154(b) by 1139 days.

(21) Appl. No.: 17/600,196

(22) PCT Filed: May 28, 2020

(86) PCT No.: PCT/JP2020/021118
§ 371 (c)(1),
(2) Date: Sep. 30, 2021

(87) PCT Pub. No.: WO2020/241755
PCT Pub. Date: Dec. 3, 2020

(65) Prior Publication Data

US 2022/0177633 A1 Jun. 9, 2022

(30) Foreign Application Priority Data

May 29, 2019 (JP) ................................ 2019-099866

(51) Int. Cl.

| | |
|---|---|
| ***C08F 292/00*** | (2006.01) |
| ***C08F 220/18*** | (2006.01) |
| ***C08G 83/00*** | (2006.01) |
| ***C08K 3/36*** | (2006.01) |
| ***C08K 9/08*** | (2006.01) |
| ***C08L 23/12*** | (2006.01) |
| ***C08L 51/10*** | (2006.01) |

(52) U.S. Cl.
CPC ...... *C08F 292/00* (2013.01); *C08F 220/1804* (2020.02); *C08K 3/36* (2013.01); *C08K 9/08* (2013.01); *C08L 23/12* (2013.01); *C08F 2438/00* (2013.01); *C08G 83/001* (2013.01); *C08K 2201/003* (2013.01); *C08L 51/10* (2013.01)

(58) Field of Classification Search
CPC ....... C08F 292/00; C08G 83/001; C08L 51/10
See application file for complete search history.

(56) References Cited

U.S. PATENT DOCUMENTS

2008/0149901 A1* 6/2008 Choi ........................ H01B 1/24 252/514
2014/0341958 A1* 11/2014 Gosselin ............... F28D 20/023 424/766
2015/0038643 A1* 2/2015 Hishikawa .............. C09C 1/043 556/427
2015/0197593 A1 7/2015 Benicewicz et al.
2015/0266990 A1 9/2015 Benicewicz et al.
2019/0144661 A1 5/2019 Oda et al.
2020/0300327 A1 9/2020 Oda et al.

FOREIGN PATENT DOCUMENTS

| | | | | | |
|---|---|---|---|---|---|
| CN | 101016399 | A | | 8/2007 | |
| CN | 101942171 | A | | 1/2011 | |
| CN | 106188364 | A | * | 12/2016 | |
| CN | 107189201 | A | | 9/2017 | |
| EP | 2607392 | A1 | * | 6/2013 | ............ B01D 15/40 |
| JP | 58-36450 | A | | 3/1983 | |
| JP | H05-331329 | A | | 12/1993 | |
| JP | 11-92675 | A | | 4/1999 | |
| JP | 2002003819 | A | | 1/2002 | |
| JP | 2006316169 | A | * | 11/2006 | ......... A61F 2/30767 |
| JP | 2008214481 | A | | 9/2008 | |
| JP | 2010024263 | A | | 2/2010 | |
| JP | 2012025830 | A | | 2/2012 | |
| JP | 2013213144 | A | | 10/2013 | |
| JP | 2017197733 | A | | 11/2017 | |
| JP | 2019099807 | A | | 6/2019 | |
| JP | 2020094091 | A | | 6/2020 | |
| WO | WO-03051977 | A1 | * | 6/2003 | .............. C08L 83/04 |
| WO | WO-2008062975 | A1 | * | 5/2008 | ........... C08F 257/02 |
| WO | WO-2015029909 | A1 | | 3/2015 | |
| WO | WO-2016161252 | | | 10/2016 | |
| WO | WO-2016199715 | A1 | | 12/2016 | |

OTHER PUBLICATIONS

Lebedev, B.V., et al, Thermodynamics of the reaction between poly-1,1,2-trichlorobuta-1,3-diene and poly(ethylene imine), Russian Chemical Bulletin, vol. 45, No. 10, Oct. 1996, pp. 2345-2349. (Year: 1996).*
Taylor & Francis, Polymers—A Property Database (2nd Edition), 2009. Table collected and truncated by Knovel. (Year: 2009).*

(Continued)

*Primary Examiner* — Kregg T Brooks
*Assistant Examiner* — David R. Foss
(74) *Attorney, Agent, or Firm* — Element IP, PLC

(57) ABSTRACT

A thermoplastic resin composition containing a thermoplastic resin and composite particles in which a polymer graft chain is bonded to a particle surface. The thermoplastic resin composition of the present invention can be suitably used in manufactured products such as audio equipment, electric appliances, construction buildings, industrial equipment, automobile members, members of two-wheelers such as motorcycles and bicycles, and containers.

10 Claims, No Drawings

(56) References Cited

OTHER PUBLICATIONS

Aldrich, "Thermal Transitions of Homopolymers", obtained from https://web.archive.org/web/20160520175847/https://www3.nd.edu/~hgao/thermal_transitions_of_homopolymers.pdf (Year: 2016).*
Machine translation of CN-106188364-A obtained from IP.com (Year: 2016).*
Meaurio, E., et al, "Predicting miscibility in polymer blends using the Bagley plot: Blends with poly(ethylene oxide)", Polymer 113 (2017) 295-309. (Year: 2017).*
Machine translation of JP-2006316169-A obtained from WIPO/Global Dossier (Year: 2006).*
International Search Report issued Aug. 11, 2020 in PCT/JP2020/021118, 3 pages.
Extended European Search Report issued Apr. 21, 2023 in Patent Application No. 20815585.3, 7 pages.
Office Action in Chinese Patent Application No. 202080037309.1, issued Apr. 28, 2023, 6 pages.
Suhua Wu, Experiment on Polymer Processing Engineering, China Light Industry Press, Jul. 31, 2013, p. 159, 3 pages total.
Combined Chinese Office Action and Search Report issued Nov. 9, 2022 in Patent Application No. 202080037309.1, 6 pages.
Combined Chinese Office Action and Search Report issued Jul. 25, 2025, in corresponding Chinese Patent Application No. 202311479747.5 (with English translation of the Office Action only), 7 pages.
Jian, Jiao, "Polymer Physics", Northwestern Polytechnical University Press, Oct. 2015, p. 105.
Office Action issued Jun. 19, 2025, in corresponding Japanese Patent Application No. 2024-162518, 2 pages.

* cited by examiner

THERMOPLASTIC RESIN COMPOSITION

FIELD OF THE INVENTION

The present invention relates to a thermoplastic resin composition and a method for producing the same, an additive for improving vibration-damping properties of the thermoplastic resin, and a vibration-damping material containing the thermoplastic resin composition.

BACKGROUND OF THE INVENTION

In the recent years, countermeasures for vibrations of various equipment have been required, and especially, the countermeasures are in demand in fields of automobiles, household electric appliances, precision instruments, and the like. In general, materials having high vibration-damping properties include materials in which a metal plate and a vibration-absorbing material such as a rubber or asphalt are pasted together, or composite materials such as vibration-damping steel plates in which a vibration-absorbing material is sandwiched with metal plates. These vibration-damping materials retain the form of a metal plate having high rigidity while absorbing vibrations with a vibration-absorbing material. In addition, vibration-damping materials include alloy materials in which kinetic energy is converted to thermal energy utilizing twinning or ferromagnetization to absorb vibrations even when metals alone are used. However, there are some disadvantages that the composite materials have limitations in molding processability because different materials are pasted together, and that a manufactured product itself becomes heavy because a metal steel plate is used. In addition, the alloy materials are also heavy because of use of metals alone, and further have been insufficient in vibration-damping properties.

In view of the conventional techniques mentioned above, a functional resin composition having a vibration-damping function has been proposed. For example, Patent Publication 1 discloses a molded article made of a vibration-damping resin obtained by molding a polypropylene resin composition of resin components containing a crystalline polypropylene (PP) added and blended with a high-density polyethylene (PE) or an aromatic hydrocarbon resin, blended with a reinforcing inorganic filler, characterized in that the above resin composition includes resin components that are further added and mixed with a hydrogenated additive of an aromatic vinyl-conjugated diene-based block copolymer.

Patent Publication 1: Japanese Patent Laid-Open No. Hei-5-331329

SUMMARY OF THE INVENTION

Problems to be Solved by the Invention

The present invention relates to a new thermoplastic resin composition having excellent vibration-damping properties and a method for producing the same, an additive for improving vibration-damping properties of the thermoplastic resin, and a vibration-damping material containing the thermoplastic resin composition.

The present invention relates to the following [1] to [4]:

[1] A thermoplastic resin composition containing a thermoplastic resin and composite particles in which a polymer graft chain is bonded to a particle surface,

[2] A method for producing a thermoplastic resin composition, including melt-kneading a thermoplastic resin and composite particles in which a polymer graft chain is bonded to a particle surface.

[3] An additive for improving vibration-damping properties of a thermoplastic resin, containing composite particles in which a polymer graft chain is bonded to a particle surface.

[4] A vibration-damping material containing a thermoplastic resin composition as defined in [1], containing a thermoplastic resin and composite particles in which a polymer graft chain is bonded to a particle surface.

[5] A vibration-damping material containing a thermoplastic resin and composite particles in which a polymer graft chain is bonded to a particle surface.

[6] A method for producing a vibration-damping material, including melt-kneading a thermoplastic resin and composite particles in which a polymer graft chain is bonded to a particle surface.

[7] Use of composite particles in which a polymer graft chain is bonded to a particle surface for improvement of vibration-damping properties of a thermoplastic resin.

[8] A method for improving vibration-damping properties of a thermoplastic resin, using composite particles in which a polymer graft chain is bonded to a particle surface.

Effects of the Invention

According to the present invention, a new thermoplastic resin composition having excellent vibration-damping properties and a method for producing the same, an additive for improving vibration-damping properties of the thermoplastic resin, and a vibration-damping material containing the thermoplastic resin composition can be provided.

Modes for Carrying Out the Invention

The present inventors have newly found out that the vibration-damping properties are improved by forming some sorts of bonds between an elastomer and a filler added to a thermoplastic resin composition, to thereby reinforce an interface thereof. Although the mechanisms thereof are not ascertained, it is assumed to be due to the fact that the strain energy at the elastomer can be increased by reinforcing the interface between the elastomer and the filler. In addition, the present inventors have newly found that excellent vibration-damping properties are obtained by using composite particles obtained by Grafting from method including polymerizing a polymer graft chain corresponding to an elastomer from a polymerization initiation point on the surface of the particles used as a filler, as the composite particles in which the elastomer and the filler are bonded. It is assumed that this obtainment is accomplished because the polymer graft chain is bonded in a high density to the particle surface according to the Grafting from method, whereby the interfaces thereof can be remarkably reinforced.

[Thermoplastic Resin Composition]

The thermoplastic resin composition of the present invention contains a thermoplastic resin and composite particles in which a polymer graft chain is bonded to a particle surface.

[Thermoplastic Resin]

The thermoplastic resin includes polyolefin resins, polyester resins, polyamide resins, ABS resins, polystyrene resins, polycarbonate resins, vinyl chloride resins, acrylic resins, and the like. Among them, from the viewpoint of easiness in handling of the resin composition obtained, such as moldability, one or more members selected from the group consisting of polyolefin resins, polyamide resins, and ABS resins are preferred, one or more members selected from the group consisting of polyolefin resins are more preferred, and polypropylene resins are even more preferred.

Although the mass-average molecular weight of the thermoplastic resin is not particularly limited, the thermoplastic resin having a mass-average molecular weight of from 5000 to 500000 and the like can be used.

The blending amount of the thermoplastic resin in the thermoplastic resin composition of the present invention is preferably 30% by mass or more, more preferably 40% by mass or more, and even more preferably 50% by mass or more, from the viewpoint of obtaining a molded article or a vibration-damping material that exhibits a desired elastic modulus. On the other hand, the blending amount is preferably 95% by mass or less, more preferably 80% by mass or less, and even more preferably 75% by mass or less, from the viewpoint of obtaining a molded article or a vibration-damping material that exhibits the desired vibration-damping properties. The blending amount in cases where two or more kinds of thermoplastic resins are blended is a total amount of the thermoplastic resins.

[Composite Particles]

The composite particles are those in which a polymer graft chain is bonded to a particle surface. As the particles, a known filler can be used, which includes metal oxides, salts of metal oxides, metal hydroxides, metal carbonates, celluloses, and the like. One or more members selected from the group consisting of metal oxides, salts of metal oxides, metal hydroxides, and metal carbonates are preferred, one or more members selected from the group consisting of silicon oxides such as silica, and silicates such as mica and talc are more preferred, and silica is even more preferred. The shapes of the particles include, but not particularly limited to, platy, granular, acicular, and fibrous forms, and the like. In cases where the term simply described herein as "particles" refers to particles used in the production of the composite particles. The polymer graft chain includes homopolymers or copolymers of styrenic monomers, nitrile-based monomers, (meth)acrylic monomers, unsaturated olefins, conjugated diene-based monomers, and the like. From the viewpoint of obtaining a molded article or a vibration-damping material that exhibits the desired vibration-damping properties, homopolymers or copolymers of one or more monomers selected from the group consisting of acrylic acid, methacrylic acid, and derivatives thereof are preferred, homopolymers or copolymers of one or more monomers selected from methacrylic acid and derivatives thereof are more preferred, and poly(butyl methacrylate) is even more preferred. The bonding is preferably a chemical bond, and more preferably a covalent bond, from the viewpoint of obtaining a molded article or a vibration-damping material that exhibits the desired vibration-damping properties.

The glass transition temperature Tg of the polymer graft chain in the composite particles is preferably −30° C. or higher, more preferably −10° C. or higher, even more preferably 10° C. or higher, and even more preferably 25° C. or higher, from the viewpoint of exhibiting the vibration-damping properties, and the glass transition temperature is preferably 80° C. or lower, more preferably 50° C. or lower, and even more preferably 40° C. or lower, from the same viewpoint. In addition, the polymer graft chain in the composite particles may have two or more glass transition temperatures Tg's, or the polymer graft chain may have a Tg outside the Tg of −30° C. or higher and 80° C. or lower. The glass transition temperature Tg of the polymer graft chain in the composite particles can be controlled by monomers used in the production of the composite particles, the molecular weight, and the molecular weight distribution. For example, in cases of composite particles, it has been known that when the graft density is increased and the polymer chain becomes a fully extended chain, Tg is increased. In addition, in that case, the Tg can be controlled by adjusting the graft densities. The viscoelasticity tan δ of the resin reaches its maximum in the temperature region near the Tg, thereby making it effective in exhibiting the vibration-damping properties. The vibration-damping properties of the desired temperature region can be increased by controlling the Tg. The glass transition temperature Tg is measured in accordance with a method described in Examples set forth below.

The graft density of the polymer graft chain in the composite particles is preferably 0.001 chains/nm$^2$ or more, more preferably 0.01 chains/nm$^2$ or more, and even more preferably 0.1 chains/nm$^2$ or more, from the viewpoint of increasing the strain energy in the elastomer. On the other hand, the graft density is preferably 5 chains; nm$^2$ or less, more preferably 3 chains/nm$^2$ or less, even more preferably 1 chain/nm$^2$ or less, and even more preferably 0.3 chains/nm$^2$ or less, from the viewpoint of easiness in the grafting of the polymer chain. The graft density is measured in accordance with a method described in Examples set forth below.

The film thickness of the polymer graft chain in the composite particles is preferably 1 nm or more, more preferably 3 urn or more, and even more preferably 5 nm or more, from the viewpoint of efficiently increasing the strain energy in the elastomer. On the other hand, the film thickness is preferably 1 μm or less, more preferably 100 nm or less, even more preferably 40 nm or less, and even more preferably 15 nm or less, from the same viewpoint. The film thickness of the polymer graft chain is calculated in accordance with a method described in Examples set forth below.

The number-average molecular weight of the polymer graft chain in the composite particles is preferably 10,000 or more, more preferably 20,000 or more, and even more preferably 30,000 or more, from the viewpoint of controlling the film thickness of the polymer graft chain. In addition, the number-average molecular weight is preferably 1,000,000 or less, more preferably 500,000 or less, and even more preferably 200,000 or less, from the same viewpoint. The number-average molecular weight of the polymer graft chain is measured in accordance with a method described in Examples set forth below.

The blending amount of the composite particles in the thermoplastic resin composition of the present invention is preferably 1% by mass or more, more preferably 10% by mass or more, even more preferably 20% by mass or more, and even more preferably 25% by mass or more, from the viewpoint of exhibiting the vibration-damping properties. On the other hand, the blending amount is preferably 75% by mass or less, more preferably 60% by mass or less, even more preferably 55% by mass or less, and even more preferably 50% by mass or less, from the viewpoint of obtaining a molded article or a vibration-damping material that exhibits a desired elastic modulus. The blending amount in cases where two or more kinds of the composite particles are contained is a total amount of the composite particles.

The blending amount of the composite particles in the thermoplastic resin composition of the present invention, based on 100 parts by mass of the thermoplastic resin, is preferably 1 part by mass or more, more preferably 20 parts by mass or more, even more preferably 30 parts by mass or more, and even more preferably 40 parts by mass or more, from the viewpoint of exhibiting the vibration-damping properties. On the other hand, the blending amount is preferably 300 parts by mass or less, more preferably 200 parts by mass or less, even more preferably 100 parts by mass or less, and even more preferably 90 parts by mass or less, from the viewpoint of obtaining a molded article or a vibration-damping material that exhibits a desired elastic modulus. The content of the polymer graft chain of the composite particles in the thermoplastic resin composition of the present invention, based on 100 parts by mass of the thermoplastic resin, is preferably 1 part by mass or more, more preferably 5 parts by mass or more, and even more preferably 1.0 parts by mass or more, from the viewpoint of exhibiting the vibration-damping properties. On the other hand, the content is preferably 100 parts by mass or less, more preferably 50 parts by mass or less, and even more preferably 40 parts by mass or less, from the viewpoint of obtaining a molded article or a vibration-damping material that exhibits a desired elastic modulus.

The dispersed particle diameter of the composite particles in the thermoplastic resin composition of the present invention is preferably 10 nm or more, more preferably 100 nm or more, and even more preferably 1 μm or more, from the viewpoint of exhibiting the vibration-damping properties, and the dispersed particle diameter is preferably 200 μm or less, more preferably 100 μm or less, and even more preferably 10 μm or less, from the same viewpoint. The composite particles may exist alone or may exist as an aggregate. The dispersed particle diameter of the composite particles is measured in accordance with a method described in Examples set forth below.

[Method for Producing Composite Particles]

The composite particles are obtained by bonding a polymer graft chain to a particle surface. The method of bonding a polymer graft chain to a particle surface is not particularly limited so long as the method is capable of carrying out grafting the polymer chain, and a Grafting from method including polymerizing a polymer graft chain from a polymerization initiating point on the particle surface is preferred. The polymerization method includes, but not particularly limited to, radical polymerization, anionic polymerization, cationic polymerization, and the like. Among them, the living radical polymerization, the living anionic polymerization, and the living cationic polymerization are preferred, from the viewpoint of facilitation in control of the molecular weights and the molecular weight distribution of the polymer chains, and from the viewpoint of easiness in grafting diversified copolymers, and the living radical polymerization is more preferred, from the viewpoint of being applicable to a wide range of monomers. As the living radical polymerization method, an atom transfer radical polymerization method (ATRP method), a reversible addition-fragmentation chain-transfer polymerization method (RAFT method), or a nitroxide-mediated living radical polymerization method (NMP method) can be used, and the atom transfer radical polymerization method (ATRP method) is preferred, from the same viewpoint.

More specifically, the method for producing composite particles is exemplified by a production embodiment including step 2 mentioned below, and optionally step 1 mentioned below may be carried out.

step 1: bonding a polymerization initiating group to a particle surface; and step 2: contacting particles having a polymerization initiating group on the surface and a monomer under the conditions for living radical polymerization.

The steps 1 and 2 mentioned above can be carried out under known conditions in the living radical polymerization.

The particles having a polymerization initiating group on the surface in the step 2 are not particularly limited so long as the particles having a binding group that bonds the particle surface and the polymer chain. The polymerization initiating group is a living radical polymerization initiating group, preferably an atom transfer radical polymerization initiating group, more preferably a haloacyl group, even more preferably a α-haloacyl group, even more preferably a α-bromoacyl group, and even more preferably a 2-bromoisobutyryl group, from the viewpoint of bonding the polymer graft chain to the particle surface. The compound which serves as a raw material for the binding group moiety is a compound having a group for bonding to the particle surface and a polymerization initiating group, a compound having a group for bonding to the particle surface or a polymerization initiating group, or the like. The step 1 includes introducing an amino group or a hydroxy group to a particle surface and introducing a polymerization initiating group. Preferably, from the viewpoint of bonding the polymer graft chain to the particle surface, the step includes introducing an amino group or a hydroxy group to a particle surface and thereafter introducing a polymerization initiating group to the particle surface. The compound used in the step of introducing an amino group or a hydroxyl group to a particle surface is a compound having a group bonding to a particle surface, and an amino group or a hydroxyl group, and the compound is preferably a silane compound, more preferably an aminoalkyl silane compound, and even more preferably 3-aminopropyl trimethoxysilane, from the viewpoint of easy availability. The compound used in the step of introducing a polymerization initiating group to a particle surface is a compound having a polymerization initiating group and a functional group reactive to an amino group or a hydroxy group, and the compound is preferably a haloalkanoic acid derivative, more preferably a bromoalkanoic acid derivative, even more preferably 2-bromo-2-methylpropionic acid derivative, and even more preferably 2-bromoisobutyl bromide, from the viewpoint of bonding the polymer graft chain to the particle surface. As the particles, for example, in a case where the particles originally have a polymerization initiating moiety, a case where a polymerization initiating moiety is formed as a consequence of surface treatment such as plasma treatment, or the like, the step 1 is not needed because the particles have a polymerization initiating group. However, in a case where silica, mica, talc, glass fillers, or the like each not having a polymerization initiating group is used, the step 1 may be carried out. Here, in the step 1, a silane coupling agent without containing a polymerization initiating group may be added to a polymerization initiating group-containing silane coupling agent and used, from the viewpoint of adjusting the grafting density. In the step of bonding a polymerization initiating group to a particle surface in the step 1, from the viewpoint of not aggregating the particles.

As the monomer in the step 2, a monomer constituting a known thermoplastic elastomer can be used as a vibration-damping elastomer. The monomer constituting a thermoplastic elastomer described above includes styrenic monomers, nitrile-based monomers, (meth)acrylic monomers, unsaturated olefins, conjugated diene-based monomers, and the like, and other monomers having a specified group in the side chain can also be used. In the step of contacting particles having a polymerization initiating group on the surface and a monomer under the conditions for living radical polymerization in the step 2, a method of dispersing the particles, the monomer, and the composite particles in a dispersion medium, and polymerizing them is preferred, from the viewpoint of not aggregating the particles, the monomer, and the composite particles.

In addition, after the polymerization, the composite particles may be optionally purified. In the purifying step of the composite particles, a method of dispersing the polymer in a dispersion medium, and removing the solvent is preferred, from the viewpoint of not aggregating the particles. Further, a method of removing a metal catalyst used in the polymerization step is preferred.

The thermoplastic resin composition of the present invention can be formulated, as components other than those mentioned above, with a chain extender, a plasticizer, an organic crystal nucleating agent, an inorganic crystal nucleating agent, a hydrolysis inhibitor, a flame retardant, an antioxidant, a lubricant such as a hydrocarbon wax or an anionic surfactant, photostabilizer, a pigment, a mildewproof agent, a bactericidal agent, a blowing agent, other polymer materials, or the like.

[Method for Producing Thermoplastic Resin Composition]

The method for producing a thermoplastic resin composition of the present invention includes a method including melt-kneading a thermoplastic resin and composite particles in which a polymer graft chain is bonded to a particle surface. In the melt-kneading, a known kneader such as a tightly closed kneader, a single-screw or twin-screw extruder, or an open-roller-type kneader can be used. After the melt-kneading, a melt-kneaded product may be dried or cooled in accordance with a known method. Also, the raw materials can be subjected to melt-kneading after homogeneously mixing them with a Henschel mixer, a Super mixer or the like in advance. The melt-kneading temperature and the melt-kneading time are not unconditionally set because they depend upon the kinds of the raw materials used, and it is preferable that the melt-kneading temperature and the melt-kneading time are preferably 170° to 240° C. for 15 to 900 seconds.

The amount of the composite particles in which the polymer graft chain is bonded to the particle surface in the step of melt-kneading a thermoplastic resin and composite particles in which a polymer graft chain is bonded to the particle surface, based on 100 parts by mass of the thermoplastic resin, is preferably 1 part by mass or more, more preferably 30 parts by mass or more, and even more preferably 40 parts by mass or more, from the viewpoint of exhibiting the vibration-damping properties, and the amount is preferably 200 parts by mass or less, more preferably 100 parts by mass or less, and even more preferably 90 parts by mass or less, from the same viewpoint.

[Additives]

The additives of the present invention contain composite particles in which a polymer graft chain is bonded to a particle surface. The additives of the present invention can optionally contain a chain extender, a plasticizer, an organic crystal nucleating agent, an inorganic crystal nucleating agent, a hydrolysis inhibitor, a flame retardant, an antioxidant, a lubricant such as a hydrocarbon wax or an anionic surfactant, an ultraviolet absorbent, an antistatic agent, an anti-clouding agent, a photostabilizer, a pigment, a mildewproof agent, a bactericidal agent, a blowing agent, or the like. Further, in the additives of the present invention, a part of a resin to be melt-kneaded together (for example, from 0.1 to 50.0% by mass of the additives) may be contained. The additives of the present invention can be used as additives for improving vibration-damping properties of the thermoplastic resin. Therefore, the present invention also discloses a method of using composite particles in which a polymer graft chain is bonded to a particle surface for improvement in vibration-damping properties of the thermoplastic resin.

[Vibration-Damping Materials]

The thermoplastic resin composition of the present invention can be suitably used as a vibration-damping material which is used in manufactured articles of audio equipment, electric appliances, construction buildings, industrial equipment, automobile members, members of two-wheelers including motorcycles and bicycles, containers, or the like, or parts or housing thereof, by using various mold-processing methods such as injection molding extrusion molding or thermoforming.

For example, in a case where a part or housing containing a thermoplastic resin composition of the present invention is produced by injection molding, the part or housing is obtained by filling pellets of a thermoplastic resin composition of the present invention to an injection-molding machine, and injecting molten pellets into a mold to mold.

In the injection molding, a known injection-molding machine can be used, including, for example, a machine comprising a cylinder and a screw inserted through an internal thereof as main constituting elements [J75E-D, J110AD-180H manufactured by The Japan Steel Works, Ltd. or the like]. Here, although the raw materials for the thermoplastic resin composition of the present invention may be supplied to a cylinder and directly melt-kneaded, it is preferable that a product previously melt-kneaded is filled in an injection-molding machine.

In addition, when a molding method other than the injection molding is used, molding may be carried out in accordance with a known method without particular limitations.

The molded article of the thermoplastic resin composition of the present invention can be suitably used as a vibration-damping material which is used in manufactured articles of audio equipment, electric appliances, construction buildings, industrial equipment, automobile members, members of two-wheelers including motorcycles and bicycles, containers, or the like, or parts or housing thereof. The applications thereto can be appropriately set depending upon the methods for producing parts, housing, the apparatus and the equipment, applied sites, and desired purposes, which can be used in accordance with the conventional methods in the art.

With respect to the above-mentioned embodiments, the present invention further discloses the following vibration-damping materials and the method for producing the same.

<1>

A vibration-damping material containing a thermoplastic resin and composite particles in which a polymer graft chain is bonded to a particle surface.

<2>

The vibration-damping material according to <1>, wherein the graft density of the polymer graft chain is preferably 0.001 chains/nm$^2$ or more, more preferably 0.01 chains/nm$^2$ or more, and even more preferably 0.1 chains/nm$^2$ or more.

<3>

The vibration-damping material according to <1> or <2>, wherein the graft density of the polymer graft chain is preferably 5 chains/nm$^2$ or less, more preferably 3 chains/nm$^2$ or less, even more preferably 1 chain/nm$^2$ or less, and even more preferably 0.3 chains/nm$^2$ or less.

<4>

The vibration-damping material according to any one of <1> to <3>, wherein the glass transition temperature of the polymer graft chain is preferably −30° C. or higher, more preferably −10° C. or higher, even more preferably 10° C. or higher, and even more preferably 25° C. or higher.

<5>

The vibration-damping material according to any one of <1> to <4>, wherein the glass transition temperature of the polymer graft chain is preferably 80° C. or lower, more preferably 50° C. or lower, and even more preferably 40° C. or lower.

<6>

The vibration-damping material according to any one of <1> to <5>, wherein the film thickness of the polymer graft chain in the composite particles is preferably 1 nm or more, more preferably 3 nm or more, and even more preferably 5 nm or more.

<7>

The vibration-damping material according to any one of <1> to <6>, wherein the film thickness of the polymer graft chain in the composite particles is preferably 1 μm or less, more preferably 100 nm or less, even more preferably 40 nm or less, and even more preferably 15 nm or less.

<8>

The vibration-damping material according to any one of <1> to <7>, wherein the number-average molecular weight of the polymer graft chain in the composite particles is preferably 10,000 or more, more preferably 20,000 or more, and even more preferably 30,000 or more.

<9>

The vibration-damping material according to any one of <1> to <8>, wherein the number-average molecular weight of the polymer graft chain in the composite particles is preferably 1,000,000 or less, more preferably 500,000 or less, and even more preferably 200,000 or less.

<10>

The vibration-damping material according to any one of <1> to <9>, wherein the dispersed particle diameter of the composite particles in the thermoplastic resin composition of the present invention is preferably 10 nm or more, more preferably 100 nm or more, and even more preferably 1 μm or more.

<11>

The vibration-damping material according to any one of <1> to <10>, wherein the dispersed particle diameter of the composite particles in the thermoplastic resin composition of the present invention is preferably 200 μm or less, more preferably 100 μm or less, and even more preferably 10 μm or less.

<12>

The vibration-damping material according to any one of <1> to <11>, wherein the blending amount of the composite particles in the vibration-damping material, based on 100 parts by mass of the thermoplastic resin, is preferably 1 part by mass or more, more preferably 20 parts by mass or more, even more preferably 30 parts by mass or more, and even more preferably 40 parts by mass or more.

<13>

The vibration-damping material according to any one of <1> to <12>, wherein the blending amount of the composite particles in the vibration-damping material, based on 100 parts by mass of the thermoplastic resin, is preferably 300 parts by mass or less, more preferably 200 parts by mass or less, even more preferably 100 parts by mass or less, and even more preferably 90 parts by mass or less,

<14>

The vibration-damping material according to any one of <1> to <13>, wherein the blending amount of the composite particles in the vibration-damping material is preferably 1% by mass or more, more preferably 10% by mass or more, even more preferably 20% by mass or more, and even more preferably 25% by mass or more.

<15>

The vibration-damping material according to any one of <1> to <14>, wherein the blending amount of the composite particles in the vibration-damping material is preferably 75% by mass or less, more preferably 60% by mass or less, even more preferably 55% by mass or less, and even more preferably 50% by mass or less.

<16>

The vibration-damping material according to any one of <1> to <15>, wherein the content of the polymer graft chain of the composite particles in the vibration-damping material, based on 100 parts by mass of the thermoplastic resin, is preferably 1 part by mass or more, more preferably 5 parts by mass or more, and even more preferably 10 parts by mass or more,

<17>

The vibration-damping material according to any one of <1> to <16>, wherein the content of the polymer graft chain of the composite particles in the vibration-damping material, based on 100 parts by mass of the thermoplastic resin, is preferably 100 parts by mass or less, more preferably 50 parts by mass or less, and even more preferably 40 parts by mass or less.

<18>

The vibration-damping material according to any one of <1> to <17>, wherein the blending amount of the thermoplastic resin in the vibration-damping material is preferably 30% by mass or more, more preferably 40% by mass or more, and even more preferably 50% by mass or more.

<19>

The vibration-damping material according to any one of <1> to <18>, wherein the blending amount of the thermoplastic resin in the vibration-damping material is preferably 95% by mass or less, more preferably 80% by mass or less, and even more preferably 75% by mass or less.

<20>

The vibration-damping material according to any one of <1> to <19>, wherein the thermoplastic resin is preferably one or more members selected from the group consisting of polyolefin resins, polyamide resins, and ABS resins, more preferably one or more members selected from the group consisting of polyolefin resins, and even more preferably polypropylene resins.

<21>

The vibration-damping material according to any one of <1> to <20>, wherein the particles are made of one or more members selected from the group consisting of metal oxides, salts of metal oxides, metal hydroxides, and metal carbonates, more preferably one or more members selected from the group consisting of silicon oxides such as silica and silicates such as mica and talc, and even more preferably silica.

<22>

The vibration-damping material according to any one of <1> to <21>, wherein the polymer graft chain is preferably a polymer of one or more monomers selected from the group consisting of styrenic monomers, nitrile-based monomers, (meth)acrylic monomers, unsaturated olefins, and conjugated diene-based monomers, more preferably homopolymers or copolymers of one or more monomers selected from the group consisting of acrylic acid, methacrylic acid, and derivatives thereof, even more preferably homopolymers or copolymers of one or more monomers selected from methacrylic acid and derivatives thereof, and even more preferably poly(butyl methacrylate).

<23>

A method for producing a vibration-damping material, including melt-kneading a thermoplastic resin and composite particles in which a polymer graft chain is bonded to a particle surface.

<24>

The method for producing a vibration-damping material according to <23>, including the step of bonding the polymer graft chain to the particle surface.

<25>

The method for producing a vibration-damping material according to <24>, wherein the method of bonding the polymer graft chain to the particle surface is a Grafting from method including polymerizing the polymer graft chain from a polymerization initiating point of the particle surface.

<26>

The method for producing a vibration-damping material according to <25>, wherein the polymerization method is preferably a radical polymerization, an anionic polymerization, or a cationic polymerization, more preferably a living radical polymerization, a living anionic polymerization, or a living cationic polymerization, even more preferably a living radical polymerization, even more preferably an atom transfer radical polymerization method (ATRP method), a reversible addition-fragmentation chain-transfer polymerization method (RAFT method), or a nitroxide-mediated living radical polymerization method (NMP method), and even more preferably an atom transfer radical polymerization method (ATRP method).

<27>

The method for producing a vibration-damping material according to any one of <24> to <26>, wherein the method of bonding a polymer graft chain to the particle surface includes the following step 1 and step 2; step 1: bonding a polymerization initiating group to a particle surface; and step 2: contacting particles having a polymerization initiating group on the surface and a monomer under the conditions for living radical polymerization.

<28>

The method for producing a vibration-damping material according to <27>, wherein the polymerization initiating group is a living radical polymerization initiating group, preferably an atom transfer radical polymerization initiating group, more preferably a haloacyl group, even more preferably an α-haloacyl group, even more preferably an α-bromoacyl group, and even more preferably a 2-bromoisobutyryl group.

<29>

The method for producing a vibration-damping material according to <27> or <28>, wherein the step 1 includes introducing an amino group or a hydroxy group to a particle surface and introducing a polymerization initiating group to a particle surface, and preferably including introducing an amino group or a hydroxy group to a particle surface and thereafter introducing a polymerization initiating group to the particle surface.

<30>

The method for producing a vibration-damping material according to any one of <27> to <29>, wherein the compound used in the step of introducing an amino group or a hydroxyl group to a particle surface is a compound having a group bonding to a particle surface and an amino group or a hydroxyl group, preferably a silane compound, more preferably an aminoalkyl silane compound, and even more preferably a 3-aminopropyl trimethoxysilane.

<31>

The method for producing a vibration-damping material according to any one of <27> to <30>, wherein the compound used in the step of introducing a polymerization initiating group to a particle surface is a compound having a polymerization initiating group and a functional group reactive to an amino group or a hydroxy group, preferably a haloalkanoic acid derivative, more preferably a bromoalkanoic acid derivative, even more preferably 2-bromo-2-methylpropionic acid derivative, and even more preferably 2-bromoisobutyl bromide.

EXAMPLES

The present invention will be described more specifically hereinbelow by means of the following Examples, without intending to limit the present invention thereto.

<Glass Transition Temperature of Polymer Graft Chain in Composite Particles>

The glass transition temperature was measured in accordance with a method of JIS K 7121. The heat capacity was measured by heating composite particles from 40° C. to 200° C. at a rate of 10° C./minute with a differential scanning calorimeter DSC7020 manufactured by Hitachi High-Tech Science Corporation. The midpoint glass transition temperature Tmg, ° C., in the SC thermogram, was obtained as a temperature at an intersection point of a linear line in equidistance from a linear line extended from each baseline in a direction of the axis of ordinates, with a curve of the stepwise changing parts of the glass transition.

<Number-Average Molecular Weight of Polymer Graft Chain in Composite Particles>

As the number-average molecular weight of the polymer graft chain in the composite particles, the number-average molecular weight of a polymer chain not being bonded to composite particles concurrently formed in the step of producing composite particles was measured as a number-average molecular weight of the polymer graft chain. The number-average molecular weight mentioned above was measured by gel permeation chromatogram (GPC) in which GMHHR-H+GMHHR-H (cationic) was used as a column, and chloroform was used as a solvent under the conditions of a flow rate of 1.0 mL/minute and a column temperature of 40° C., using polystyrenes as conversion molecular weight standards.

<Graft Density of Polymer Graft Chain in Composite Particles>

The graft density, chains/$nm^2$, was calculated in accordance with the following formula, measuring a graft amount W and a number-average molecular weight Mn of the graft chain. Here, the graft amount was obtained by thermogravimetric loss measurement (TG). More specifically, the temperature was raised from 40° C. to 500° C. at a rate of 10° C./minute in the air, and a weight loss rate at that time was measured. The number-average molecular weight of the graft chain was obtained in accordance with the gel permeation chromatogram (GPC) as shown below.

Graft Density,chains/$nm^2$=Graft Amount,g/$nm^2$/Number-Average Molecular Weight of Graft Chain× (Avogadro Number)

<Film Thickness of Polymer Graft Chain in Composite Particles>

The film thickness was calculated from the following formula. As the polymer density, a polymer density of a polymer chain not being bonded to the composite particles concurrently formed in the step of producing composite particles was defined as a polymer density of the polymer graft chain. The film thickness was measured by a pycnometer method as prescribed in JIS K 7112.

Calculation Formula for Polymer Film Thickness $$L = \frac{\sigma \times M_n}{d \times N_A \times 10^{-21}}$$

L: film thickness, nm
σ: graft density, chains/nm$^2$
d: polymer density, g/cm$^3$
$N_A$: Avogadro number
$M_n$: number-average molecular weight <Dispersed Particle Diameter of Composite Particles>

In composite particles in the thermoplastic resin, a broken side of a test piece of a thermoplastic resin composition was measured with a scanning electron microscope (SEM). From the images observed with the SEM, cross-sections of 30 composite particles were selected, and each of long diameter was visually read off, and an average was defined as a dispersed particle diameter.

Conditions

Apparatus: Electric emission scanning electron microscope S-4000, Hitachi, Ltd.
Acceleration factor: 10 kV
Spot diameter: 8 mm
Magnification: 400 to 5000 folds

[Preparation of Composite Particles 1]

a) Step of Bonding a Polymerization Initiating Group to a Particle Surface a-1) Introduction of an Amino Group to a Fine Silica Particle Surface 40 g of fine silica particles SILFIL NSS-3N, manufactured by Tokuyama, average particle diameter: 120 nm, and 2 g of 3-aminopropyl trimethoxysilane KBM-903, manufactured by Shin-Etsu Chemical Co., Ltd. were added to 200 mL of ethanol. The liquid mixture was stirred at room temperature for 12 hours, Thereafter, the liquid mixture was washed with ethanol, fine silica particles were collected with a centrifuge, and the fine silica particles were then heated at 110° C. for 1 hour, to provide amino group-introduced fine silica particles.

a-2) Introduction of a Polymerization Initiating Group to an Amino Group-Introduced Fine Silica Particle Surface A 500 mL-eggplant shaped flask was charged with 40 g of the amino group-introduced fine silica particles mentioned above, 200 mL of anhydrous THF, 1 mL of anhydrous trimethylamine manufactured by Tokyo Chemical Industry Co., Ltd., and 1 mL of 2-bromoisobutyl bromide (BIBB) manufactured by Tokyo Chemical Industry Co., Ltd., and the mixture was stirred at room temperature for 2 hours. Thereafter, the mixture was washed with THF and methanol, and polymerization initiating group-introduced fine silica particles in which a 2-bromoisobutyryl group was introduced as a polymerization initiating group were collected with a centrifuge, and then stored as a methanol solution of polymerization initiating group-introduced fine silica particles.

b) Step of contacting particles having a polymerization initiating group on a surface and a monomer under the conditions of living method as prescribed in JIS K 7112.

Calculation Formula for Polymer Film Thickness $$L = \frac{\sigma \times M_n}{d \times N_A \times 10^{-21}}$$

L: film thickness, nm
σ: graft density, chains/nm$^2$
d: polymer density, g/cm$^3$
$N_A$: Avogadro number
$M_n$: number-average molecular weight <Dispersed Particle Diameter of Composite Particles>

In composite particles in the thermoplastic resin, a broken side of a test piece of a thermoplastic resin composition was measured with a scanning electron microscope (SEM). From the images observed with the SEM, cross-sections of 30 composite particles were selected, and each of long diameter was visually read off, and an average was defined as a dispersed particle diameter.

Conditions

Apparatus: Electric emission scanning electron microscope S-4000, Hitachi, Ltd.
Acceleration factor: 10 kV
Spot diameter: 8 mm
Magnification: 400 to 5000 folds

[Preparation of Composite Particles 1]

a) Step of Bonding a Polymerization Initiating Group to a Particle Radical Polymerization A 500 mL eggplant-shaped flask was charged with a methanol solution containing 40 g of fine silica particles having a polymerization initiating group prepared, 160 mL of methanol, 40 mL of water, and 35 g of butyl methacrylate manufactured by Tokyo Chemical Industry Co., Ltd., and the mixture was subjected to nitrogen bubbling for one hour. Thereafter, a methanol solution prepared by previously stirring 11 mg of Cu(II)Br manufactured by Tokyo Chemical Industry Co., Ltd. and 90 mg of pentamethyl diethylenetriamine manufactured by Tokyo Chemical industry Co., Ltd. in 2 mL of methanol was poured to the flask. After sufficiently stirring, an aqueous solution of 90 mg of ascorbic acid manufactured by Tokyo Chemical industry Co., Ltd. was poured to the flask, to initiate the polymerization. Thereafter, the contents were heated to 40° C., and stirred for 4 hours. Thereafter, the mixture was washed with methanol, and fine silica particles grafted with poly(butyl methacrylate) were collected with a centrifuge. The content of the polymer graft chain was 35.5% by mass.

[Preparation of Composite Particles 2]

b) Step of Contacting Particles Having a Polymerization Initiating Group on a Surface and a Monomer Under the Conditions of Living Radical Polymerization A 500 mL-eggplant shaped flask was charged with an anisole solution containing 40 g of fine silica particles having a polymerization initiating group prepared in the same manner as the step a) of Preparation of Composite Particles 1, 20 mL of anisole, and 60 g of butyl methacrylate manufactured by Tokyo Chemical Industry Co., Ltd. The contents were heated to 60° C., sufficiently stirred, and then subjected to nitrogen bubbling for one hour. Thereafter, an anisole solution prepared by previously stirring 144 mg of Cu(I)Br manufactured by Tokyo Chemical Industry Co., Ltd. and 346 mg of pentamethyl diethylenetriamine manufactured by Tokyo Chemical Industry Co., Ltd. in 2 mL of anisole was poured to the flask, to initiate the polymerization. Thereafter, the contents were stirred for 10 hours. Thereafter, the mixture was dispersed in chloroform, and washed with methanol and an aqueous ammonia, and the solvents were dried off, to provide fine silica particles grafted with poly(butyl methacrylate). The content of the polymer graft chain was 32.0% by mass.

[Preparation of Composite Particles 3]

The same procedures as in Composite Particles 2 were carried out except for the following changes: The amount of the fine silica particles supplied was changed to 6 g, the amount of anisole supplied to 60 mL, the amount of butyl methacrylate supplied to 180 g, the polymerization temperature to 80° C., the amount of Cu(I)Br stirred in 2 mL of anisole to 431 mg, the amount of pentamethyl diethylenetriamine to 1040 mg, and the polymerization time to 5 minutes.

[Preparation of Composite Particles 4]

The same procedures as in Composite Particles 3 were carried out except that the polymerization time was changed to 15 minutes.

[Preparation of Composite Particles 5]

The same procedures as in Composite Particles 3 were carried out except that the polymerization time was changed to 30 minutes.

[Preparation of Composite Particles 6]

The same procedures as in Composite Particles 2 were carried out except for the following changes: The amount of the fine silica particles supplied was changed to 20 g, the amount of anisole supplied to 3 mL, the amount of butyl methacrylate supplied to 100 g, and the polymerization temperature to 80° C.

[Preparation of Composite Particles 7]

The same procedures as in Composite Particles 3 were carried out except that the fine silica particles were changed to Nipsil AQ, and that the polymerization time was changed to 20 minutes.

[Preparation of Composite Particles 8]

The same procedures as in Composite Particles 3 were carried out except that the fine silica particles were changed to fine mica particles A-21S, and that the polymerization time was changed to 20 minutes.

[Preparation of Composite Particles 9]

The same procedures as in Composite Particles 3 were carried out except for the following changes: The amount of fine silica particles supplied was changed to 12 g, the amount of Cu(I)Br supplied to 861 mg, the amount of pentamethyl diethylenetriamine supplied to 2080 mg, the polymerization time to 10 minutes, and butyl methacrylate to hexyl methacrylate manufactured by Tokyo Chemical Industry Co., Ltd.

[Preparation of Thermoplastic Resin Compositions]

Examples 1 to 3 and Comparative Example 1 c) Step of Melt-Kneading Composite Particles with a Thermoplastic Resin

Each of the components as listed in Table 1 was blended in an amount as listed in Table 1 and melt-kneaded at 200° C., with a Labo-plastomill, manufactured by TOYO SEIKI SEISAKU-SHO, to provide a thermoplastic resin composition.

Examples 4 to 13 and 15 to 17

The same procedures as in Examples 1 to 3 were carried out except that the blends were changed to those as listed in Table 2 or 3, to provide each of thermoplastic resin compositions.

Example 14

The same procedures as in Examples 1 to 3 were carried out except for the following changes: The blend was changed to that as listed in Table 3, the melt-kneading temperature to 240° C., the melting temperature during press molding to 240° C., and the cooling temperature to 80° C., to provide a thermoplastic resin composition.

<Loss Factor>

Using an autopress molding machine manufactured by TOYO SEIKI SEISAKU-SHO, test pieces were melted at 200° C. and cooled at 30° C., to mold into loss factor test pieces (127 mm×12.7 mm×1.6 mm). As to the test pieces, the loss factor was calculated in accordance with half band width method from peaks of secondary resonance frequency of the frequency response function measured according to a central excitation method as prescribed in JIS K7391. A system comprising Type 3160 as an oscillator, Type 2718 as an amplifier, Type 4810 as an excitation element, and Type 8001 as an accelerator sensor, all of which are manufactured by B & K, and a loss factor measurement software MS18143 was used. The measurement environment was controlled with a thermostat PU-3J manufactured by ESPEC Corporation, and measurements were taken within the temperature ranges of from 0° C. to 80° C., The results at 20° C. and 80° C. are shown in Tables 1 to 3.

TABLE 1

| | | Units | Ex. 1 | Ex. 2 | Ex. 3 | Comp. Ex. 1 |
|---|---|---|---|---|---|---|
| Blending Amount | Polypropylene | parts | 100 | 100 | 100 | 100 |
| | Composite particles 1 | parts | 84.5 | 42.3 | — | — |
| | Composite particles 2 | parts | — | — | 46.9 | — |
| | PBMA | parts | — | — | — | 15.0 |
| | $SiO_2$ | parts | — | — | — | 31.9 |
| Parts by mass of the graft chain based on 100 parts by mass of PP | | parts | 30.0 | 15.0 | 15.0 | — |
| Parts by mass of $SiO_2$ derived from composite particles, based on 100 parts by mass of PP | | parts | 54.5 | 27.3 | 31.9 | — |
| Glass transition temperature | Polymer graft chain | ° C. | 35 | 35 | 30 | — |
| | PBMA | ° C. | — | — | — | 35 |
| Graft density | | chains/nm$^2$ | 0.010 | 0.010 | 0.20 | 0 |
| Number-average molecular weight | Polymer graft chain | Mn | 300000 | 300000 | 35000 | — |
| | PBMA | Mn | — | — | — | 100000 |

TABLE 1-continued

| | | Units | Ex. 1 | Ex. 2 | Ex. 3 | Comp. Ex. 1 |
|---|---|---|---|---|---|---|
| Polymer density | | g/mL | 1.07 | 1.07 | 1.07 | 1.07 |
| Dispersed particle diameter of composite particles | | μm | 50 | 50 | 5 | — |
| Film thickness of filler surface polymer | | nm | 4 | 4 | 10 | 0 |
| Evaluations | | | | | | |
| Vibration-damping properties | Loss factor at 20° C. | — | 0.10 | 0.08 | 0.09 | 0.07 |
| | Loss factor at 80° C. | — | 0.22 | 0.15 | 0.19 | 0.12 |

TABLE 2

| | | Units | Ex. 4 | Ex. 5 | Ex. 6 | Ex. 7 | Ex. 8 | Ex. 9 | Ex. 10 | Ex. 11 |
|---|---|---|---|---|---|---|---|---|---|---|
| Blending Amount | Polypropylene | parts | 100 | 100 | 100 | 100 | 100 | 100 | 100 | 100 |
| | Composite particles 2 | parts | 23.4 | 31.2 | — | — | — | — | — | — |
| | Composite particles 3 | parts | — | — | 49.9 | — | — | — | — | — |
| | Composite particles 4 | parts | — | — | — | 38.8 | — | — | — | — |
| | Composite particles 5 | parts | — | — | — | — | 24.4 | — | 24.4 | 24.4 |
| | Composite particles 6 | parts | | | | | | 33.9 | — | — |
| | Mica | parts | | | | | | | 20.0 | — |
| | GF | parts | | | | | | | | 5.0 |
| Parts by mass of the graft chain based on 100 parts by mass of PP | | parts | 7.5 | 10.0 | 15.0 | 15.0 | 15.0 | 15.0 | 15.0 | 15.0 |
| Parts by mass of $SiO_2$ derived from composite particles, based on 100 parts by mass of PP | | parts | 15.9 | 21.2 | 34.9 | 23.8 | 9.4 | 18.9 | 9.4 | 9.4 |
| Glass transition temperature | Polymer graft chain | ° C. | 30 | 30 | 30 | 30 | 30 | 30 | 30 | 30 |
| Graft density | | chains/nm$^2$ | 0.20 | 0.20 | 0.17 | 0.12 | 0.12 | 0.37 | 0.12 | 0.12 |
| Number-average molecular weight | Polymer graft chain | Mn | 35000 | 35000 | 51000 | 77000 | 187000 | 36000 | 187000 | 187000 |
| Polymer density | | g/mL | 1.07 | 1.07 | 1.07 | 1.07 | 1.07 | 1.07 | 1.07 | 1.07 |
| Dispersed particle diameter of composite particles | | μm | 5 | 5 | 5 | 5 | 5 | 10 | 5 | 5 |
| Film thickness of filler surface polymer | | nm | 10 | 10 | 12 | 13 | 32 | 19 | 32 | 32 |
| Evaluations | | | | | | | | | | |
| Vibration-damping properties | Loss factor at 20° C. | — | 0.09 | 0.09 | 0.09 | 0.09 | 0.09 | 0.09 | 0.09 | 0.08 |
| | Loss factor at 80° C. | — | 0.13 | 0.17 | 0.19 | 0.18 | 0.15 | 0.14 | 0.16 | 0.14 |

TABLE 3

| | | Units | Ex. 12 | Ex. 13 | Ex. 14 | Ex. 15 | Ex. 16 | Ex. 17 |
|---|---|---|---|---|---|---|---|---|
| Blending Amount | Polypropylene | parts | 100 | 100 | — | — | 100 | 100 |
| | Polyamide | parts | — | — | 100 | — | — | — |
| | ABS | parts | — | — | — | 100 | — | — |
| | Composite particles 2 | parts | — | — | 46.9 | 46.9 | 200.0 | — |
| | Composite particles 7 | parts | 26.6 | — | — | — | — | — |
| | Composite particles 8 | parts | — | 23.1 | — | — | — | — |
| | Composite particles 9 | parts | — | — | — | — | — | 59.4 |
| Parts by mass of the graft chain based on 100 parts by mass of PP | | parts | 15.0 | 15.0 | 15.0 | 15.0 | 64.0 | 15.0 |
| Parts by mass of $SiO_2$ derived from composite particles, based on 100 parts by mass of PP | | parts | 11.6 | — | 31.9 | 31.9 | 136.0 | 44.4 |
| Parts by mass of mica derived from composite particles, based on 100 parts by mass of PP | | parts | — | 8.1 | — | — | — | — |

TABLE 3-continued

| | | Units | Ex. 12 | Ex. 13 | Ex. 14 | Ex. 15 | Ex. 16 | Ex. 17 |
|---|---|---|---|---|---|---|---|---|
| Glass transition temperature | Polymer graft chain | ° C. | 30 | 30 | 30 | 30 | 30 | −4 |
| Graft density | | chains/nm$^2$ | 0.20 | 0.20 | 0.20 | 0.20 | 0.20 | 0.12 |
| Number-average molecular weight | Polymer graft chain | Mn | 100000 | 120000 | 35000 | 35000 | 35000 | 52000 |
| Polymer density | | g/mL | 1.07 | 1.07 | 1.07 | 1.07 | 1.07 | 1.01 |
| Dispersed particle diameter particles composite | | μm | 5 | 30 | 5 | 5 | 50 | 5 |
| Film thickness of filler surface polymer | | nm | 3 | 29 | 10 | 10 | 10 | 9 |
| Evaluations | | | | | | | | |
| Vibration-damping properties | Loss factor at 20° C. | — | 0.12 | 0.12 | 0.03 | 0.02 | 0.10 | 0.15 |
| | Loss factor at 80° C. | — | 0.14 | 0.16 | 0.18 | 0.13 | 0.29 | 0.08 |

The details of each of the components shown in Tables 1 to 3 are as follows.

Polypropylene: MA03, manufactured by Nippon Polypropylene Corporation

PBMA: Poly(butyl methacrylate), manufactured by Sigma-Aldrich $SiO_2$: SILFIL NSS-3N, manufactured by Tokuyama Corporation GF: T-480, manufactured by Nippon Electronic Glass Co., Ltd.

$SiO_2$ of Composite Particles 7: Nipsil AQ, manufactured by TOSOH SILICA CORPORATION Mica of Composite Particles 8: A-21S, manufactured by YAMAGUCHI MICA CO., LTD.

Polyamide: AMMAN CM1017, manufactured by Toray Industries Inc.

ABS: TOYOLAC 7000-314, manufactured by Toray Industries, Inc.

Each of the thermoplastic resin compositions of Example 3 and Comparative Example 1 was injection-molded, and subjected to a flat plate vibration test, a fan vibration test, and a fan rotation noise test. The results are shown in Tables 4 and 5.

<Flat Plate Vibration Test>

Each of the thermoplastic resin compositions of Example 3 and Comparative Example 1 was injection-molded with an injection-molding machine J11AD-180H manufactured by The Japan Steel Works, Ltd., to mold into a flat test piece (100 mm×100 mm×2 mm). The cylinder temperatures were set at 200° C. for the sections up to fifth units from the nozzle end side, at 170° C. for the remaining one unit, and at 45° C. for the section below the hopper. The mold temperature was set at 50° C. In the vibration test, a system comprising Type 3160 as an oscillator, Type 2718 as an amplifier, Type 4810 as an excitation element, Type 8001 as an accelerator sensor, and 4189-A-029 as a noise meter was used, all of the components being manufactured by B & K. A central portion of a flat plate molded article was attached to a contact chip, and fixed to an accelerator sensor, and random excitations were then applied. The vibration levels were calculated from a ratio of the vibration acceleration rate to the excitation force within a frequency range of from 20 Hz to 12,000 Hz. In addition, the noise levels were calculated from a ratio of the noise pressure detected with a noise meter placed at a flat plate central height of 100 mm to the excitation force. The measurement environment was temperature-controlled to 20° C. or 80° C. with a thermostat PU-3J manufactured by ESPEC Corporation. It can be judged that the smaller the numerical value, the more reduced the vibrations and noises.

<Fan Vibration Test>

Each of the thermoplastic resin compositions of Example 3 and Comparative Example 1 was injection-molded with an injection-molding machine SE180D manufactured by Sumitomo Heavy Industries Limited, to mold into a plate fan molded article having the identical shape to a plate fan PLF125-18 manufactured by Fantec (diameter: 150 mm, blades: 8). The cylinder temperatures were set at 200° C. for the sections up to fifth units from the nozzle end side, at 170° C. for the remaining one unit, and at 45° C. for the section below the hopper. The mold temperature was set at 50° C. In the vibration test, a system comprising Type 3160 as an oscillator, Type 2718 as an amplifier, Type 4810 as an excitation element, Type 8001 as an accelerator sensor, and 4189-A-029 as a noise meter was used, all of the components being manufactured by B & K. A central portion of a plate fan was attached to a contact chip, and fixed to an accelerator sensor, and random excitations were then applied. The vibration levels were calculated from a ratio of the vibration acceleration rate detected with an accelerator sensor within a frequency range of from 20 Hz to 12,000 Hz to the excitation force. The measurement environment was temperature-controlled to 80° C. with a thermostat PU-3J manufactured by ESPEC Corporation. It can be judged that the smaller the numerical value, the more reduced the vibrations.

<Fan Rotation Noise Test>

The same plate fan molded article as above was used. The fan molded article was attached to a rotating shaft of a motor, AC motor manufactured by KUSATSU ELECTRIC CO., LTD., and rotated at each of the rotational speed. Noises generated at this time were collected with a noise meter 4189-A-029 manufactured by B & K at a position of 100 mm away in the width and 200 mm away from the bottom of the fan, and subjected to FFT analysis. The measurement time was 60 seconds, the average number of runs at one frequency was 358 points, and the properties of frequency-weightings were analyzed with A-weighting. The measurement environment was temperature-controlled to 80° C. with a thermostat PU-3J manufactured by ESPEC Corporation. Among the FFT analyses of fan noises at each rotational speed, the frequency of the rotation noise peaks corresponding to F=2NZ/60 and the noise levels more reduced the rotation noises.

TABLE 4

| | | Units | Ex. 3 | Comp. Ex. 1 |
|---|---|---|---|---|
| Vibration test, at 20° C. | Resonant frequency | Hz | 1912 | 1901 |
| | Vibration level | dB | 64 | 65 |
| Vibration test, at 80° C. | Resonant frequency | Hz | 1826 | 1816 |
| | Vibration level | dB | 60 | 66 |
| Noise test, at 20° C. | Resonant frequency | Hz | 1549 | 1543 |
| | Vibration noise level | dB | 11 | 12 |
| Noise test, at 80° C. | Resonant frequency | Hz | 1481 | 1475 |
| | Vibration noise level | dB | 0 | 6 |

TABLE 5

| | | Units | Fan of Ex. 3 | Fan of Comp. Ex. 1 |
|---|---|---|---|---|
| Vibration test, at 80° C. | Resonant frequency | Hz | 335 | 333 |
| | Vibration level | dB | 61 | 67 |
| Fan rotation test, at 80° C. | Rotational speed | rpm | 1150 | 1150 |
| | Frequency of rotation noise peaks of F = 2NZ/60 | Hz | 307 | 307 |
| | Noise level of rotation noise peaks of F = 2NZ/60 | dB | 31 | 31 |
| Fan rotation test, at 80° C. | Rotational speed | rpm | 1200 | 1200 |
| | Frequency of rotation noise peaks of F = 2NZ/60 | Hz | 320 | 320 |
| | Noise level of rotation noise peaks of F = 2NZ/60 | dB | 34 | 35 |
| Fan rotation test, at 80° C. | Rotational speed | rpm | 1250 | 1250 |
| | Frequency of rotation noise peaks of F = 2NZ/60 | Hz | 333 | 333 |
| | Noise level of rotation noise peaks of F = 2NZ/60 | dB | 38 | 40 |
| Fan rotation test, at 80° C. | Rotational speed | rpm | 1300 | 1300 |
| | Frequency of rotation noise peaks of F = 2NZ/60 | Hz | 347 | 347 |
| | Noise level of rotation noise peaks of F = 2NZ/60 | dB | 37 | 38 |
| Fan rotation test, at 80° C. | Rotational speed | rpm | 1350 | 1350 |
| | Frequency of rotation noise peaks of F = 2NZ/60 | Hz | 360 | 360 |
| | Noise level of rotation noise peaks of F = 2NZ/60 | dB | 39 | 39 |

From Table 1, the thermoplastic resin composition of Example 3 containing composite particles in which the polymer graft chain was bonded to the particle surface had higher loss factors at both 20° C. and 80° C., as compared to the thermoplastic resin composition of Comparative Example 1 in which the filler and the elastomer were added in the same amounts in a non-bonded state, thereby having excellent vibration-damping properties. This was confirmed in Tables 4 and 5 from the fact that the vibrations and the noises could be more reduced also in injection-molded samples. Also, as shown in Tables 1 to 3, Examples 1, 2, 4 to 13, 16, and 17 containing composite particles in which the polymer graft chain was bound to the particle surface, Example 14 using the polyamide resin, and Example 15 using the ABS resin also had high loss factors, thereby having excellent vibration-damping properties.

INDUSTRIAL APPLICABILITY

The thermoplastic resin composition of the present invention can be suitably used in manufactured products such as audio equipment, electric appliances, construction buildings, industrial equipment, automobile members, members of two-wheelers including motorcycles and bicycles, and containers.

The invention claimed is:

1. A thermoplastic resin composition comprising a thermoplastic resin and composite particles in which a polymer graft chain is bonded to a particle surface, wherein:

the graft density of the polymer graft chain is 0.001 chains/nm$^2$ or more and chains/nm$^2$ or less, the dispersed particle diameter of the composite particles is 5 μm or more and 50 μm or less, the polymer graft chain does not comprise a conjugated diene-based monomer, and the glass transition temperature of the polymer graft chain is −10° C. or higher and 80° C. or lower.

2. The thermoplastic resin composition according to claim 1, wherein the film thickness of the polymer graft chain in the composite particles is 1 nm or more and 1 μm or less.

3. The thermoplastic resin composition according to claim 1, wherein the number-average molecular weight of the polymer graft chain in the composite particles is 10,000 or more and 1,000,000 or less.

4. The thermoplastic resin composition according to claim 1, wherein the blending amount of the composite particles in the thermoplastic resin composition is 1 part by mass or more and 300 parts by mass or less, based on 100 parts by mass of the thermoplastic resin.

5. The thermoplastic resin composition according to claim 1, wherein the blending amount of the composite particles in the thermoplastic resin composition is 1% by mass or more and 75% by mass or less.

6. The thermoplastic resin composition according to claim 1, wherein the content of the polymer graft chain of the composite particles in the thermoplastic resin composition is 1 part by mass or more and 100 parts by mass or less, based on 100 parts by mass of the thermoplastic resin.

7. The thermoplastic resin composition according to claim 1, wherein the blending amount of the thermoplastic resin in the thermoplastic resin composition is 30% by mass or more and 95% by mass or less.

8. A method for producing the thermoplastic resin composition of claim 1, comprising bonding the polymer graft chain to the particle surface to provide composite particles in which the polymer graft chain is bonded to the particle surface, and melt-kneading the thermoplastic resin and the composite particles, wherein the step of bonding the polymer graft chain to the particle surface is a Grafting From method comprising polymerizing the polymer graft chain from a polymerization initiating point of the particle surface, comprising the following steps 1 and 2:

step 1: bonding a polymerization initiating group to the particle surface; and step 2: contacting particles having the polymerization initiating group on the surface and a monomer under the conditions for living radical polymerization.

9. The method for producing the thermoplastic resin composition according to claim 8, further comprising a mold-processing step.

10. A thermoplastic resin composition comprising a thermoplastic resin and composite particles in which a polymer graft chain is bonded to a particle surface, wherein:

the graft density of the polymer graft chain is 0.001 chains/nm$^2$ or more and 5 chains/nm$^2$ or less, the dispersed particle diameter of the composite particles is 5 μm or more and 50 μm or less, and the particles are made of one or more members selected from the group consisting of a metal oxide, a salt of a metal oxide, a metal hydroxide, and a metal carbonate.

* * * * *